US010915179B2

(12) United States Patent
Myggen et al.

(10) Patent No.: US 10,915,179 B2
(45) Date of Patent: Feb. 9, 2021

(54) VEHICLE AIR SUSPENSION CONTROL SYSTEM

(71) Applicant: Tesla, Inc., Palo Alto, CA (US)

(72) Inventors: Daniel Myggen, San Francisco, CA (US); Miriam Vu, San Francisco, CA (US); Ted Merendino, Menlo Park, CA (US)

(73) Assignee: TESLA, INC., Palo Alto, CA (US)

( * ) Notice: Subject to any disclaimer, the term of this patent is extended or adjusted under 35 U.S.C. 154(b) by 288 days.

(21) Appl. No.: 15/819,678

(22) Filed: Nov. 21, 2017

(65) Prior Publication Data

US 2018/0095543 A1 Apr. 5, 2018

Related U.S. Application Data

(63) Continuation of application No. 13/774,004, filed on Feb. 22, 2013, now abandoned.
(Continued)

(51) Int. Cl.
*G06F 3/01* (2006.01)
*B60G 17/016* (2006.01)
*B60G 17/015* (2006.01)
*G06F 3/0484* (2013.01)
*B60G 17/04* (2006.01)
*B60J 7/043* (2006.01)
(Continued)

(52) U.S. Cl.
CPC ........... *G06F 3/017* (2013.01); *B60G 17/015* (2013.01); *B60G 17/016* (2013.01); *B60G 17/04* (2013.01); *B60J 7/043* (2013.01); *G06F 3/04817* (2013.01); *G06F 3/04842* (2013.01); *G06F 17/00* (2013.01); *H04S 7/303* (2013.01);

*B60G 2202/152* (2013.01); *B60G 2400/204* (2013.01); *B60G 2400/252* (2013.01); *B60G 2400/51222* (2013.01); *B60G 2400/90* (2013.01); *B60G 2401/16* (2013.01); *B60G 2500/30* (2013.01); *B60G 2600/04* (2013.01); *B60G 2600/20* (2013.01); *B60G 2800/914* (2013.01)

(58) Field of Classification Search
None
See application file for complete search history.

(56) References Cited

U.S. PATENT DOCUMENTS 4,866,776 A   9/1989   Kasai et al.
5,083,275 A   1/1992   Kawagoe et al.
(Continued)

FOREIGN PATENT DOCUMENTS

DE   102004050502 A1   5/2005
EP       1028011 A2    8/2000
(Continued)

OTHER PUBLICATIONS

European Patent Office; Extended European Search Report; EP Application No. 13841506.2; dated Aug. 24, 2016; 7 pgs.
(Continued)

*Primary Examiner* — Kelly D Williams
(74) *Attorney, Agent, or Firm* — Knobbe, Martens, Olson & Bear LLP

(57) ABSTRACT

A method of automatically adjusting the ride height of a vehicle each time the vehicle is in a particular location is provided, where the automatic ride height adjustment is based on location and ride height information previously gathered from a user.

20 Claims, 17 Drawing Sheets

Related U.S. Application Data

(60) Provisional application No. 61/706,915, filed on Sep. 28, 2012.

(51) Int. Cl.
*G06F 3/0481* (2013.01)
*G06F 17/00* (2019.01)
*H04S 7/00* (2006.01)

(56) References Cited

U.S. PATENT DOCUMENTS

| | | |
|---|---|---|
| 5,271,063 A | 12/1993 | d'Alayer de Costemore d'Arc |
| 5,491,795 A | 2/1996 | Beaudet |
| 5,754,174 A | 5/1998 | Carpenter |
| 5,790,120 A | 8/1998 | Lozares |
| 5,933,597 A | 8/1999 | Hogan |
| 6,043,818 A | 3/2000 | Nakano |
| 6,204,847 B1 | 3/2001 | Wright |
| 6,454,341 B2 | 9/2002 | Tolinski |
| 7,707,514 B2 | 4/2010 | Forstall |
| 8,095,278 B2 | 1/2012 | Schaaf |
| 8,239,087 B2 | 8/2012 | Dybalski et al. |
| 8,434,019 B2 | 4/2013 | Nelson |
| 9,045,025 B1 | 6/2015 | Greene et al. |
| 10,019,066 B2 | 7/2018 | Boblett et al. |
| 10,180,727 B2 | 1/2019 | Boblett et al. |
| 2001/0043198 A1 | 11/2001 | Ludtke |
| 2002/0054133 A1 | 5/2002 | Jameson |
| 2003/0070437 A1 | 4/2003 | Hafner et al. |
| 2005/0105744 A1 | 5/2005 | Lee |
| 2005/0110229 A1 | 5/2005 | Kimura et al. |
| 2005/0135636 A1 | 6/2005 | Putti et al. |
| 2005/0152562 A1 | 7/2005 | Holmi et al. |
| 2005/0210406 A1 | 9/2005 | Biwer |
| 2005/0254775 A1 | 11/2005 | Hamilton |
| 2005/0261822 A1 | 11/2005 | Wako |
| 2005/0271219 A1 | 12/2005 | Bruelle-Drews |
| 2005/0280524 A1 | 12/2005 | Boone et al. |
| 2006/0036962 A1 | 2/2006 | Jobs et al. |
| 2006/0101352 A1 | 5/2006 | Kohar |
| 2006/0155429 A1 | 7/2006 | Boone et al. |
| 2006/0195232 A1 | 8/2006 | Obradovich |
| 2006/0262935 A1 | 11/2006 | Goose et al. |
| 2007/0101297 A1 | 5/2007 | Forstall et al. |
| 2007/0198948 A1 | 8/2007 | Toriyama |
| 2007/0234223 A1 | 10/2007 | Leavitt |
| 2008/0016456 A1 | 1/2008 | Friedland |
| 2008/0034309 A1 | 2/2008 | Louch |
| 2008/0207188 A1 | 8/2008 | Ahn |
| 2008/0297483 A1 | 12/2008 | Kim |
| 2008/0302014 A1 | 12/2008 | Szczerba et al. |
| 2009/0122018 A1 | 5/2009 | Vymenets |
| 2009/0143937 A1 | 6/2009 | Craig |
| 2009/0144622 A1 | 6/2009 | Evans et al. |
| 2009/0184480 A1* | 7/2009 | Larsson ............... B60G 17/017 280/5.503 |
| 2009/0210110 A1 | 8/2009 | Dybalski et al. |
| 2009/0313567 A1 | 12/2009 | Kwon |
| 2010/0176632 A1 | 7/2010 | Alford et al. |
| 2010/0248788 A1 | 9/2010 | Yook |
| 2010/0313164 A1 | 12/2010 | Louch et al. |
| 2010/0318266 A1 | 12/2010 | Schaaf et al. |
| 2011/0037725 A1 | 2/2011 | Pryor |
| 2011/0082627 A1 | 4/2011 | Small et al. |
| 2011/0087982 A1 | 4/2011 | McCann et al. |
| 2011/0087989 A1 | 4/2011 | McCann et al. |
| 2011/0099512 A1 | 4/2011 | Jeong |
| 2011/0138295 A1 | 6/2011 | Momchilov et al. |
| 2011/0138314 A1 | 6/2011 | Mir et al. |
| 2011/0148626 A1 | 6/2011 | Acevedo |
| 2011/0166748 A1* | 7/2011 | Schneider ............... B60K 35/00 701/36 |
| 2011/0282537 A1 | 11/2011 | Yamasaki et al. |
| 2012/0005602 A1 | 1/2012 | Anttila |
| 2012/0081310 A1 | 4/2012 | Schrock |
| 2012/0084692 A1 | 4/2012 | Bae |
| 2012/0110497 A1 | 5/2012 | Gimpl |
| 2012/0131496 A1 | 5/2012 | Goossens et al. |
| 2012/0311498 A1 | 12/2012 | Kluttz |
| 2013/0099523 A1 | 4/2013 | Brown et al. |
| 2013/0132485 A1 | 5/2013 | Thomas |
| 2013/0179304 A1 | 7/2013 | Swist |
| 2013/0208190 A1 | 8/2013 | Slothouber et al. |
| 2013/0305155 A1 | 11/2013 | Yoon |
| 2014/0093107 A1 | 4/2014 | Vu et al. |
| 2014/0095023 A1 | 4/2014 | Myggen |
| 2014/0095029 A1 | 4/2014 | Myggen |
| 2014/0095030 A1 | 4/2014 | Myggen |
| 2014/0095031 A1 | 4/2014 | Boblett et al. |
| 2014/0095997 A1 | 4/2014 | Vu et al. |
| 2014/0096003 A1 | 4/2014 | Vu et al. |
| 2014/0096069 A1 | 4/2014 | Boblett et al. |
| 2017/0277274 A1 | 9/2017 | Boblett et al. |
| 2017/0302708 A1 | 10/2017 | Monroe et al. |
| 2018/0314342 A1 | 11/2018 | Boblett et al. |

FOREIGN PATENT DOCUMENTS

| | | | |
|---|---|---|---|
| EP | 2 840 215 | | 2/2015 |
| JP | 05-278469 | | 10/1993 |
| JP | 09-261800 | | 10/1997 |
| KR | 10-2012-0014444 | | 2/2012 |
| WO | 2006135326 A1 | | 12/2006 |
| WO | WO-2006135326 A1 * | | 12/2006 ............ B60G 17/019 |

OTHER PUBLICATIONS

International preliminary report on patentability in application PCT/US2013/055827, dated Apr. 9, 2015, 8 pages.
Windows7—Adjust the sound:http://windows.microsoft.com/en-us/windows7/adjust-the-sound-level-on-your-computerTutorial on using Microsoft Windows 7 Volume Control—Accessible as early as Aug. 10, 2009.
Windows7—Touch:http://windows.microsoft.com/en-us/windows7/products/features/touchTutorial on using Microsoft Windows 7 with a Touch Screen—Accessible as early as Jun. 27, 2009.
International Application No. PCT/US2013/056138, International Search Report dated Jan. 24, 2014, 5 pages.
International Application No. PCT/US2013/055595, International Search Report dated Jan. 24, 2014, 5 paqes.
International Search Report and Written Opinion; International Application No. PCT/US2016/053424; dated Jan. 17, 2017; 7 pgs.

* cited by examiner

VEHICLE AIR SUSPENSION CONTROL SYSTEM

CROSS REFERENCE TO RELATED APPLICATIONS

The present U.S. Utility patent application claims priority pursuant to 35 U.S.C. § 120 as a continuation of U.S. Utility application Ser. No. 13/774,004, entitled "Vehicle Air Suspension Control System," filed Feb. 22, 2013, which claims priority pursuant to 35 U.S.C. § 119(e) to U.S. Provisional Application No. 61/706,915, entitled "Vehicle Air Suspension Control System," filed Sep. 28, 2012, both of which are hereby incorporated herein by reference in their entirety and made part of the present U.S. Utility patent application for all purposes.

FIELD OF THE INVENTION

The present invention relates generally to a vehicle air suspension system and, more particularly, to a system for controlling vehicle ride height using an active air suspension system.

BACKGROUND OF THE INVENTION

The suspension system of a conventional vehicle uses a combination of springs, shock absorbers and various linkage members to provide the desired level of handling and control while isolating the vehicle's occupants from unwanted road noise, vibrations and road bumps. Although most vehicles use mechanical springs, for example coil springs or leaf springs, some performance and luxury vehicles use air springs. Air springs not only provide ride leveling and an exceptionally smooth ride but, when properly configured, also allow ride height to be easily and quickly adjusted. Ride height adjustments may be made to improve vehicle aerodynamics at high speeds, vehicle access, and/or road clearance.

There are a variety of techniques that may be used to adjust and control an air suspension system. For example, an air suspension system used for road leveling will typically monitor load weight and distribution and then use this information to make minor adjustments to the air springs. Alternately, an automatic adjustment system may monitor vehicle speed, lowering the vehicle at high speeds in order to improve vehicle aerodynamics. In a user controlled system, the driver is typically provided with an interface that allows the user to select between various preset spring levels, e.g., comfort versus sport suspension or low, medium, and high ride height.

While there are a variety of automatic and user-controlled systems that are used to adjust the air springs in a conventional air suspension system, it would be beneficial to provide an automatic system that allows the air springs to be easily adjusted in accordance with changing conditions and driver preferences. The present invention provides such a control system.

DETAILED DESCRIPTION

Figure 1:
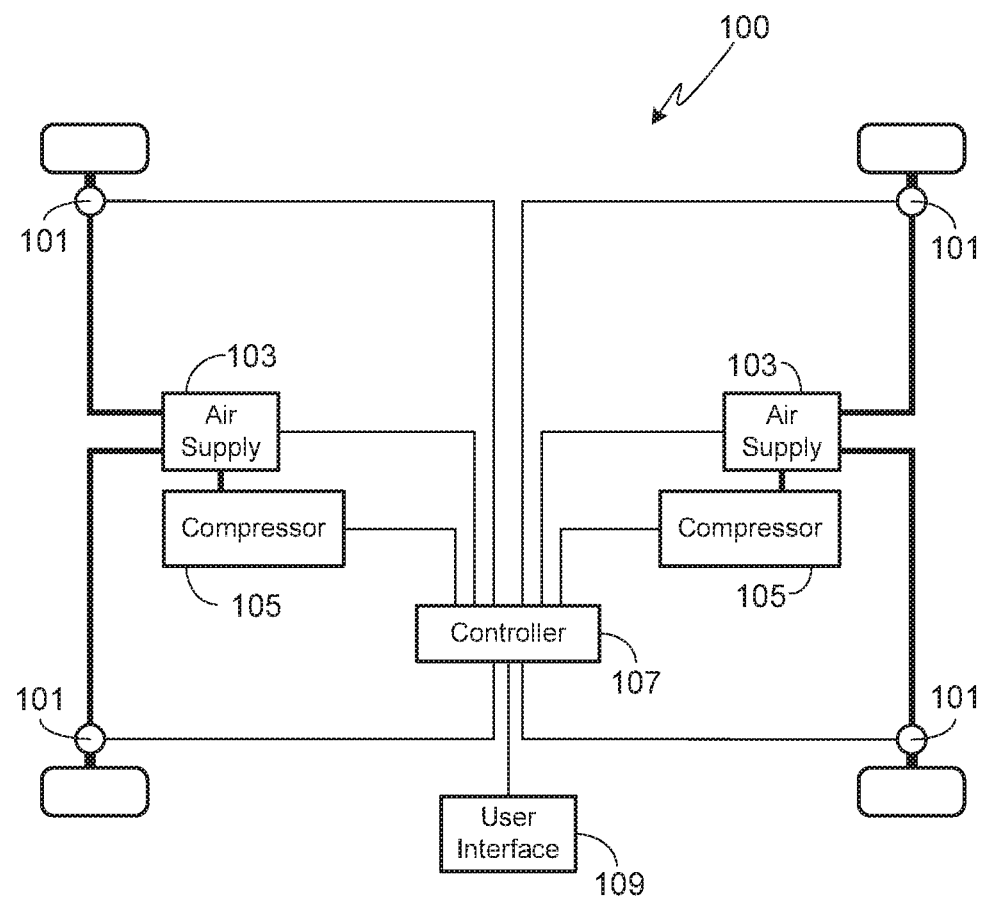
FIG. 1 provides a block diagram of an exemplary air suspension system that may be used with the present invention.

FIG. 1 provides a block diagram of an exemplary air suspension system 100 that may be used with the present invention. It should be understood that air suspension system 100 is used for illustration purposes only and that the present invention is not limited to a specific suspension configuration. For example, the type of air spring as well as the compressor/air tank configuration may be varied based on the specific requirements of the vehicle as well as the intended use of the vehicle, e.g., performance vehicle, luxury vehicle, ambulance, bus, delivery truck, etc.

Associated with each wheel in system 100 is an air spring 101. One or more compressed air supply tanks 103, along with air compressor(s) 105 and various valves (not shown), are used to regulate the air pressure within each air spring 101. Controller 107 sets the pressure for each air spring 101 as well as controlling other aspects of the air suspension system such as operation of compressor(s) 105. Although operation of controller 107 may be automated and preset by the vehicle manufacturer or a service company, preferably the system includes a user interface 109 that allows the end user, e.g., the driver, to adjust the vehicle's air suspension system. As vehicle air suspension systems are well known, and as the present invention is not limited to a particular implementation of the air suspension system, further details regarding the specifics of air suspension system 100 are not provided herein.

Figure 2:
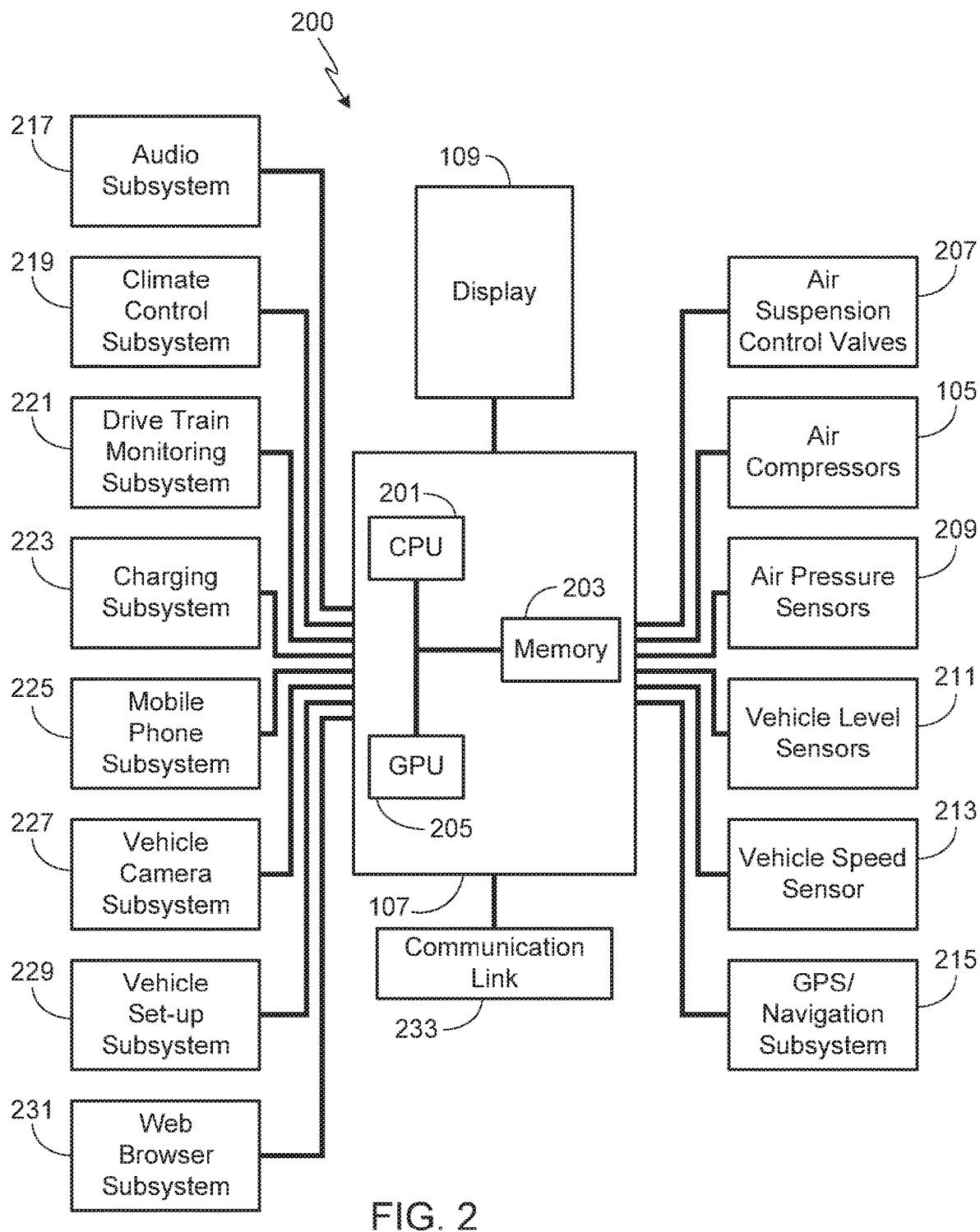
FIG. 2 provides a block diagram of an exemplary air suspension control system in accordance with the present invention.

FIG. 2 provides a block diagram of an exemplary control system 200 suitable for use with the invention. In system 200, system controller 107 includes a central processing unit (CPU) 201 and memory 203. Since user interface 109 is comprised of a touch-screen in the preferred embodiment, preferably system controller 107 also includes a graphical processing unit (GPU) 205. CPU 201 and GPU 205 may be separate or contained on a single chip set. Memory 203 may be comprised of flash memory, a solid state disk drive, a hard disk drive, or any other memory type or combination of memory types. As previously noted, controller 107 is coupled to a variety of air suspension components including the control valves 207 that determine the air pressure within each air spring 101, and the air compressors 105 that regulate the air pressure in the air supply tanks 103 or directly in the air springs. Valves 207 include bleed valves that allow the air pressure within the air springs 101 to be decreased, and valves that admit air from air supply tanks 103 or air compressors 105, thereby increasing the air pressure within the air springs. Controller 107 is also coupled to a variety of air pressure sensors 209 that allow the air pressure within the various components (e.g., air springs 101, air supply tank(s) 103, etc.) to be monitored. In at least one embodiment in which the air suspension system is used to provide ride leveling, controller 107 is also coupled to vehicle level sensors 211. In at least one embodiment in which the air suspension system adjusts ride height based on vehicle speed, controller 107 is also coupled to a vehicle speed sensor 213. In addition, and in accordance with the invention, controller 107 is coupled to a global positioning system (GPS) 215. Although GPS 215 may be a stand-alone system, preferably it is integrated into, and used by, the vehicle's navigation system.

In at least one embodiment of the invention, in addition to controlling the vehicle's air suspension system, controller 107 is also used to control and monitor a variety of other vehicle subsystems. Exemplary subsystems that may be controlled and monitored by controller 107 include audio subsystem 217, climate control subsystem 219, drive train monitoring subsystem 221, charging subsystem 223, mobile phone subsystem 225, vehicle camera subsystem 227, vehicle set-up subsystem 229 and web browser subsystem 231. Vehicle set-up subsystem 229 allows general vehicle operating conditions to be set such as seat positions, moon roof or sun roof operation, internal lighting, external lighting, windshield wiper operation, etc. Preferably a mobile telecommunications link 233 is also coupled to controller 107, thereby allowing the controller to obtain updates, interface configuration profiles, and other data from an external data source (e.g., manufacturer, dealer, service center, web-based application, remote home-based system, etc.).

Mobile telecommunications link 233 may be based on any of a variety of different standards including, but not limited to, GSM EDGE, UMTS, CDMA2000, DECT, and WiMAX.

In the preferred embodiment, user interface 109 is a touch-screen display that provides both a visual aid, for example for use with the navigation screen, and the means to input data and control the various subsystems coupled to controller 107. It should be understood, however, that other types of user interfaces may also be used with the invention.

In accordance with the invention, controller 107 uses preset location data and vehicle location data gathered using GPS 215 to automatically adjust the height of the vehicle using air springs 101. As a result, the risk of undercarriage damage and/or damage to front fascia, rear fascia, or side body panels/moldings is dramatically reduced.

Figure 3:
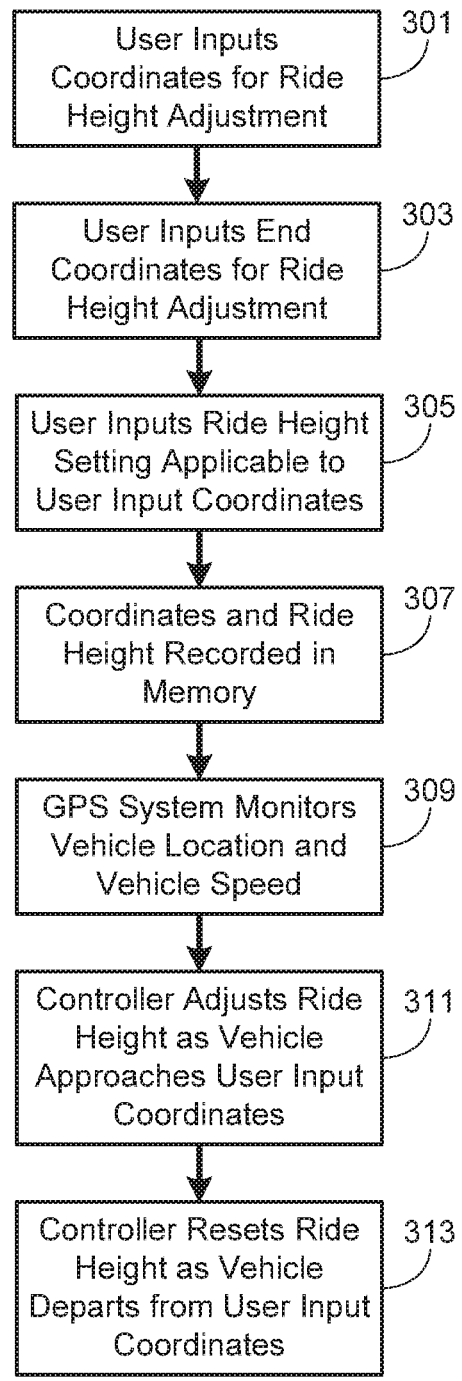
FIG. 3 illustrates the basic methodology of the invention in accordance with a preferred embodiment.

FIG. 3 illustrates the basic methodology of the invention in accordance with one embodiment. This embodiment is configured to automatically adjust the vehicle ride height each time the vehicle is in a particular location, the automatic adjustment being based on previously input user data. For example, the user may have a very steep driveway with a sharp change in incline at the driveway entrance or at the garage entrance. Alternately, the user may have to drive over a series of speed bumps every day near their home, work or other location. By inputting the coordinates for each of these locations into controller 107 and memory 203, the vehicle can be configured to automatically adjust ride height as the car approaches each preset location, thus avoiding potential vehicle damage that might otherwise occur if the driver forgot to adequately adjust ride height in a timely manner. Controller 107 can be configured to monitor vehicle speed using sensors 213, thus insuring that regardless of vehicle speed, the ride height will be adjusted prior to reaching each preset location. Controller 107 can also be configured to begin adjusting ride height a preset distance before reaching a preset location, thus insuring that the desired ride height is achieved before the vehicle reaches the preset location.

It should be understood that there are a variety of techniques that can be used to input the coordinates of each location in which the ride height is to be automatically adjusted, as well as the corresponding ride height for each location. Exemplary techniques for inputting coordinates, described in detail below, include selecting coordinates based on the vehicle's current location and inputting coordinates on a map, for example a map displayed on a vehicle display interface using the car's navigation/GPS system.

Regardless of the input technique used, the first step of the process is for the user to input the coordinates into controller 107 for each location in which automatic ride height adjustment is desired (step 301 of FIG. 3). In the embodiment illustrated in FIG. 3, the user also inputs the end location coordinates (step 303) that correspond to the location where the ride height of the vehicle can be re-adjusted back to its previous normal height setting.

In addition to inputting location coordinates, the user also inputs the desired ride height for each particular location (step 305). Depending upon the system configuration, this ride height can be input in a variety of ways. For example, the user may set the desired height as a distance above ground level (e.g., 20 centimeters). Alternately, the user may set the desired height by selecting from a number of possible presets (e.g., low, normal, high, extra-high). The coordinates and ride height data input in steps 301, 303 and 305 are recorded in memory 203 (step 307).

After one or more sets of location/ride height data are input into the system as described above, then during normal operation of the vehicle the GPS system 215 continuously monitors the vehicle location and the vehicle speed sensor 211 continuously monitors the vehicle speed (step 309), thus allowing controller 107 to automatically adjust the ride height of the vehicle as the vehicle approaches each preset location (step 311). In step 311, the ride height of the vehicle is adjusted in accordance with the preset height input in step 305. After the preset location, or region, has been passed, controller 107 automatically re-adjusts the ride height of the vehicle (step 313) to either its pre-adjusted height or in accordance with preset suspension configuration instructions, for example setting the ride height to a "standard" ride height. Note that the standard height setting may be preset by the user, preset by the vehicle manufacturer, preset by a third party (e.g., service technician), or based upon vehicle speed.

Figure 4:
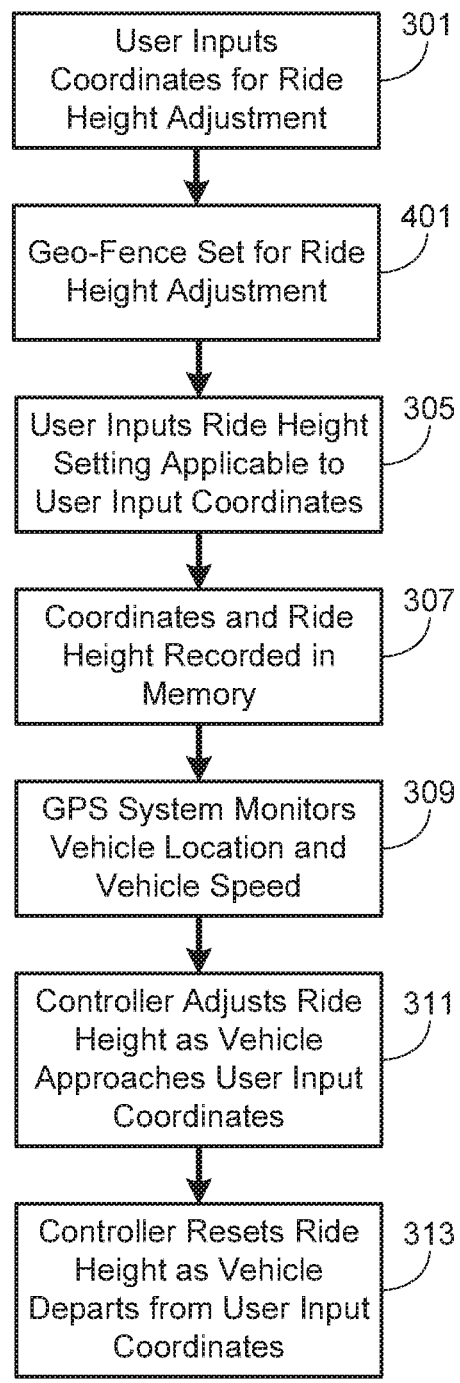
FIG. 4 illustrates a minor modification of the basic methodology shown in FIG. 3.

In at least one embodiment, rather than requiring the user to input the end location coordinates, the system is configured to allow the user to input a distance over which the ride height is to be adjusted. Preferably and as illustrated in FIG. 4, in this embodiment after the user sets the initial coordinates (step 301), they also set the size of a geo-fence (step 401). The geo-fence is simply a region bounded by an imaginary fence over which the controller will adjust the ride height (step 311) in accordance with the preset height input in step 305. In a preferred embodiment, the geo-fence is in the form of a circle with the circle's center defined by the coordinates input in step 301. The system can be configured to allow the user to set the size of the geo-fence, e.g., a circle with a 10 meter radius. Alternately, the system can be configured to allow the user to select from several pre-defined radii, e.g., a circle with a radius of 10 meters, 50 meters, 100 meters, etc. Alternately, the system can be configured to automatically apply a standard size for the geo-fence, where the standard geo-fence radius is preset by the user, preset by the vehicle manufacturer, or preset by a third party (e.g., service technician).

Figure 5:
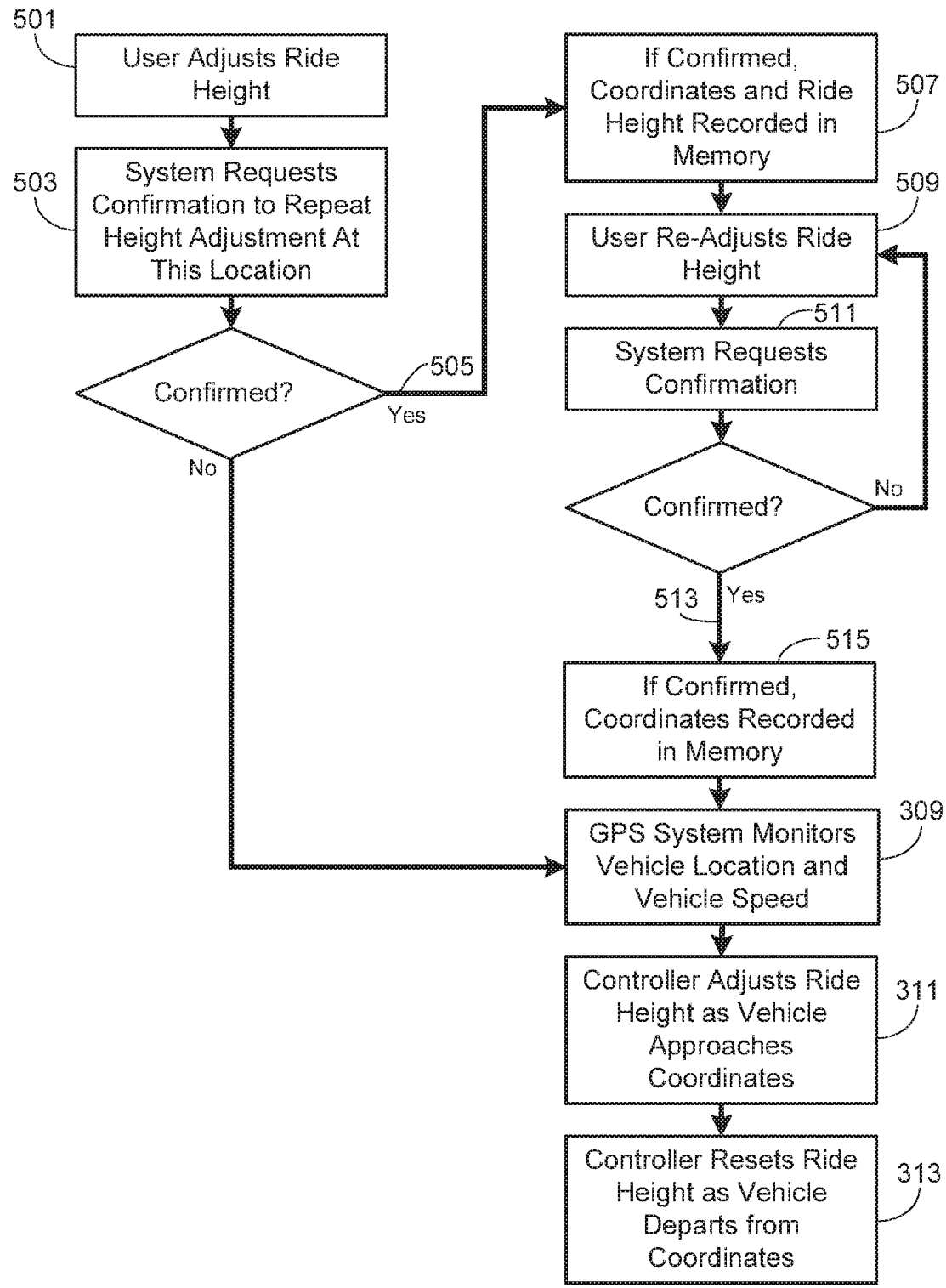
FIG. 5 illustrates the basic methodology of the invention in accordance with an alternate preferred embodiment.

The embodiment shown in FIG. 5 illustrates an alternate approach that allows the system to learn driver patterns while still distinguishing between abnormal height adjustments, for example due to a temporary road hazard, and a routine height adjustment, for example due to a speed bump or a sharp incline change in the user's driveway. In this embodiment, whenever the user adjusts the ride height (step 501) the system controller asks the user for confirmation as to whether or not to make the same adjustment every time the vehicle is at that same location (step 503). If confirmed (step 505), the system records the location and ride height data in memory (step 507). Then when the rider re-adjusts the ride height (step 509), for example back to the normal or standard setting, then the controller asks the user to confirm that this is the end location for the adjusted ride height (step 511). If confirmed (step 513), the system records the end location in memory (step 515). Once ride height and ride height adjustment locations are input, then the system operates as previously described, specifically monitoring vehicle location (step 309) and making ride height adjustments as preset by the user (steps 311/313).

Figure 6:
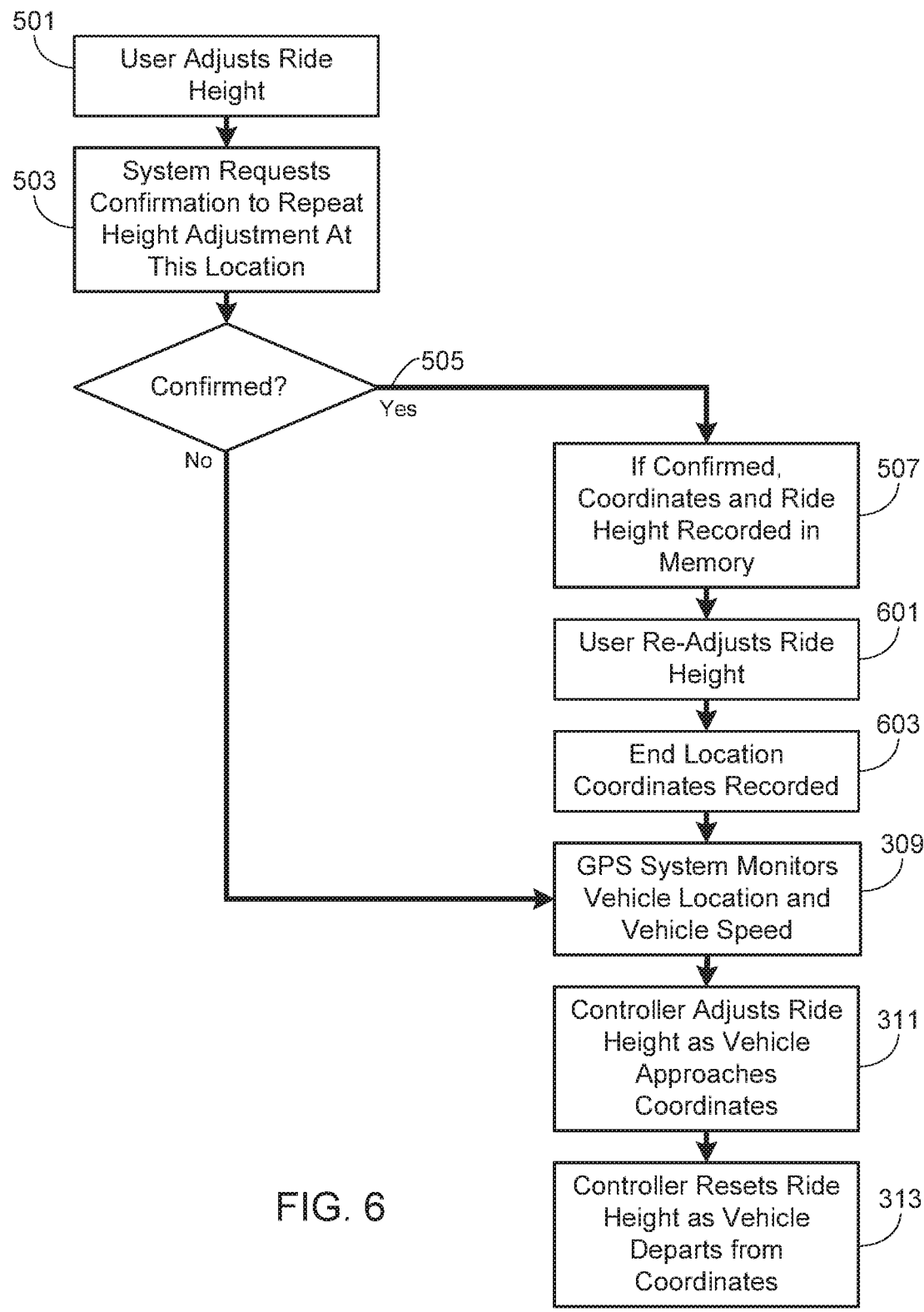
FIG. 6 illustrates a minor modification of the methodology shown in FIG. 5.

FIG. 6 illustrates a minor modification of the method shown in FIG. 5. In the method illustrated in FIG. 6, once the user adjusts the ride height (step 501) and confirms (step 505) that this location and ride height should be recorded (step 507), the system automatically uses the location that corresponds to the next height adjustment (step 601) as the end location. As a result, this end location is recorded in memory (step 603) and the second confirmation step is eliminated.

Figure 7:
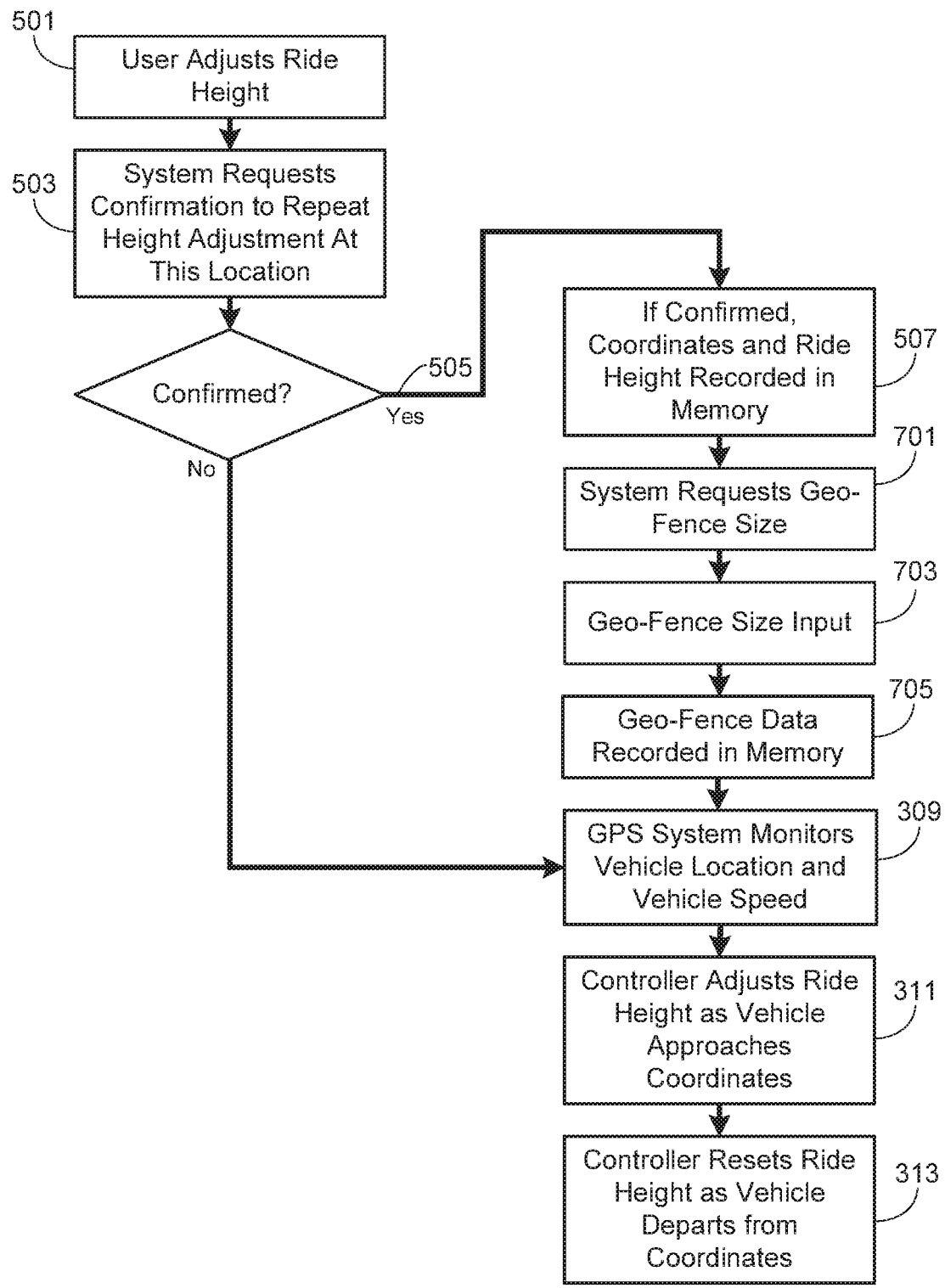
FIG. 7 illustrates a minor modification of the methodology shown in FIG. 5 utilizing a geo-fence.

FIG. 7 illustrates a method based on the methodology of FIG. 5, but utilizing the previously described geo-fence. In the method illustrated in FIG. 7, once the user adjusts the ride height (step 501) and confirms (step 505) that this location and ride height should be recorded (step 507), the system asks for the size of the geo-fence to be applied (step 701). After the user inputs the geo-fence size (step 703), either by inputting a specific geo-fence size or selecting from a set of pre-selected geo-fence sizes, the system records the geofence coordinates in memory (step 705). Once geo-fence coordinates and ride height data are input and recorded, the system operates as previously described, specifically monitoring vehicle location (step 309) and making ride height adjustments as preset by the user (steps 311/313). As previously noted, the system can also be configured to automatically apply a standard size for the geo-fence, where the standard geo-fence radius is preset by the user, vehicle manufacturer, or a third party, thereby eliminating steps 701 and 703.

Figure 8:
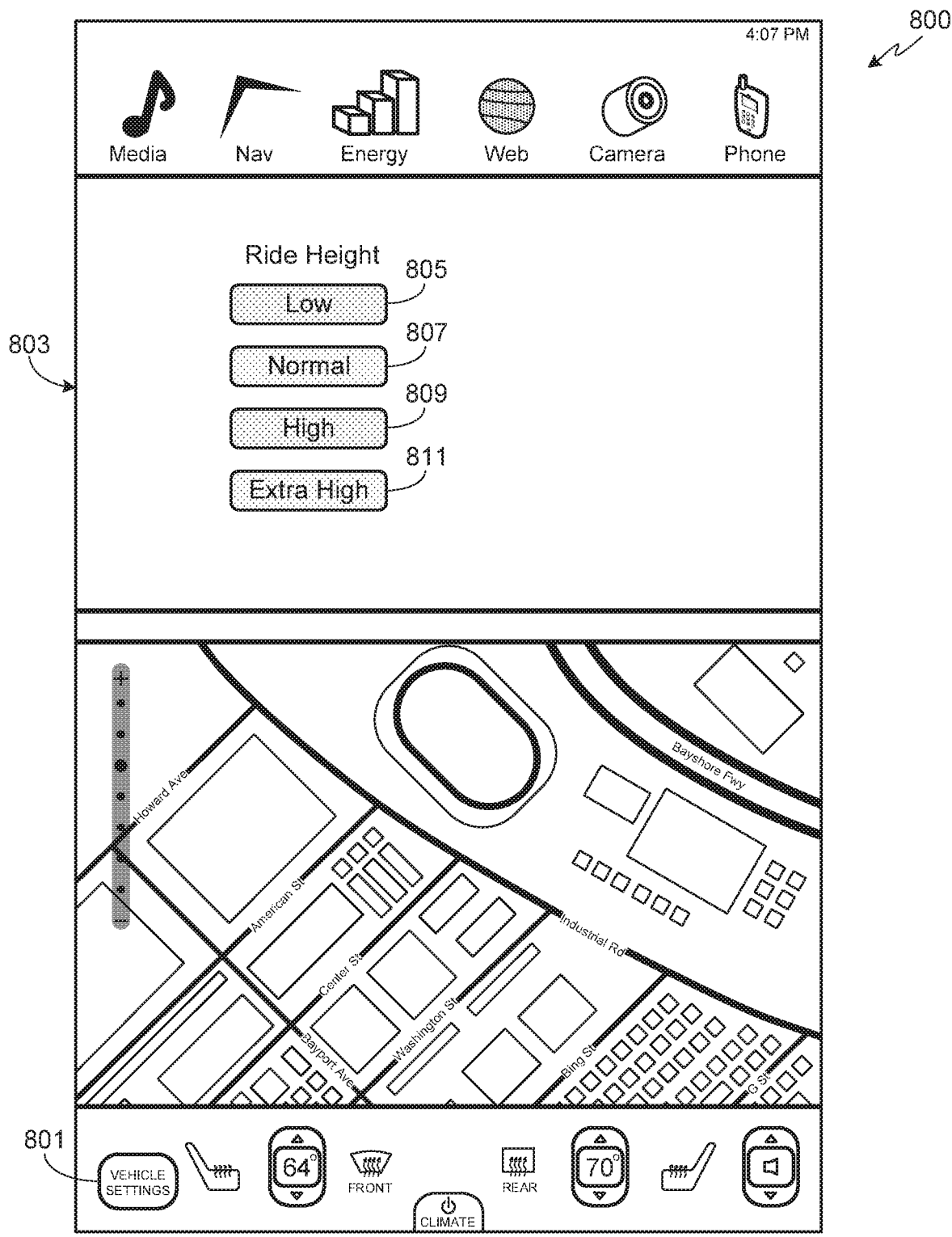
FIG. 8 illustrates an exemplary interface screen that allows user selection of ride height.
Figure 9:
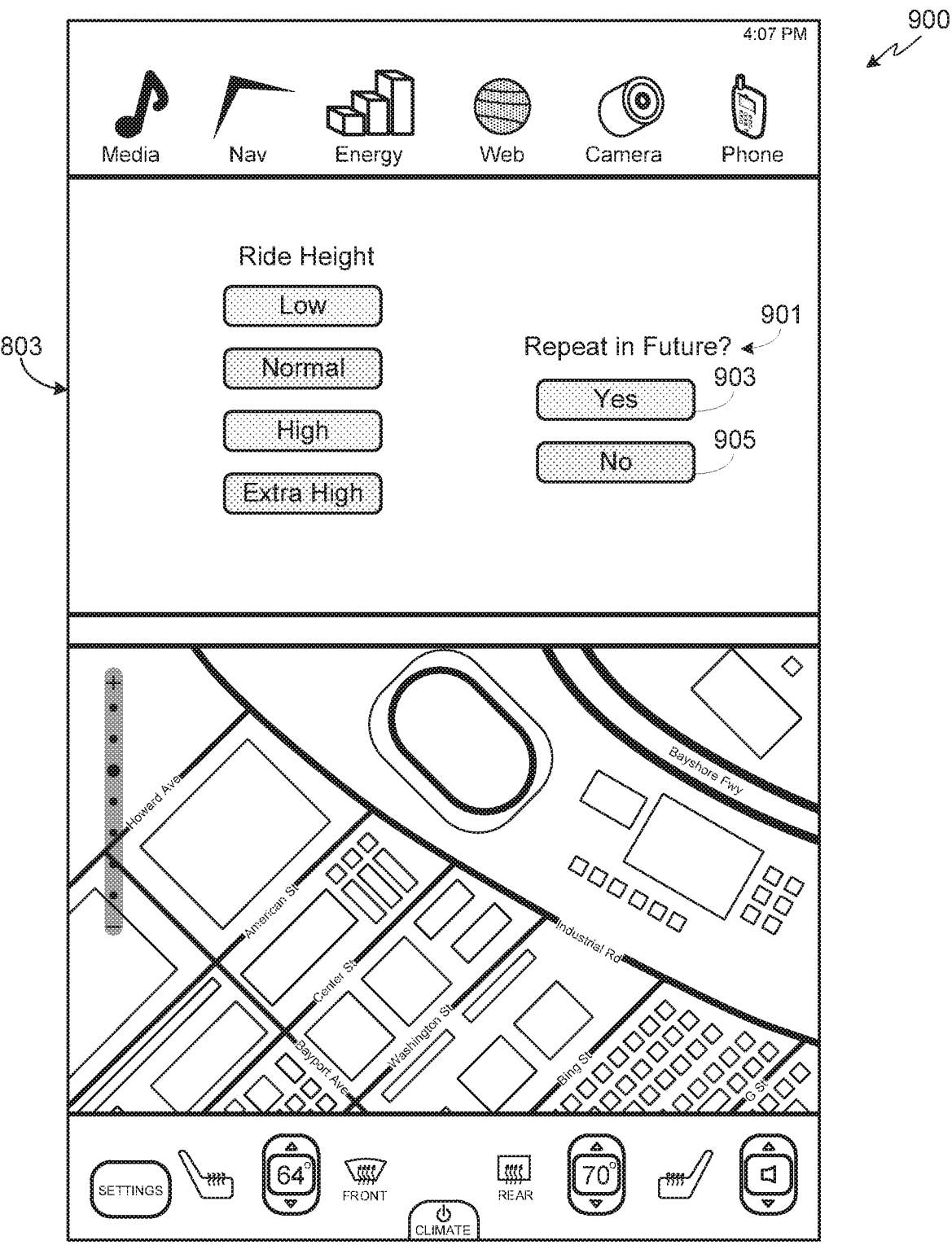
FIG. 9 illustrates an exemplary interface screen requesting input confirmation.
Figure 10:
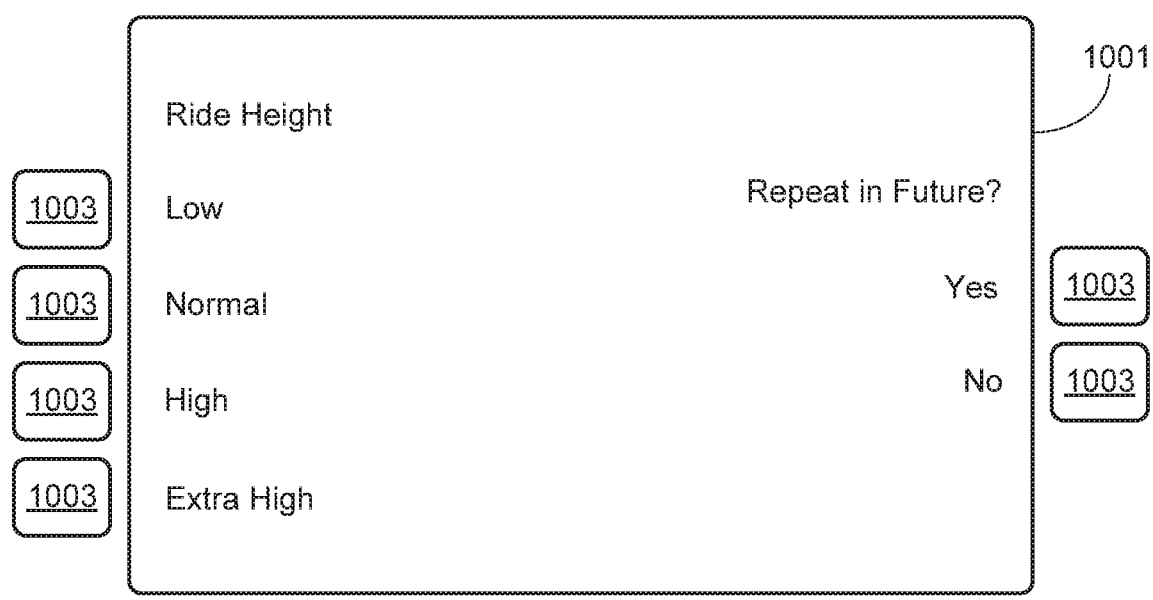
FIG. 10 illustrates a non-touch-screen interface for use with the invention.
Figure 11:
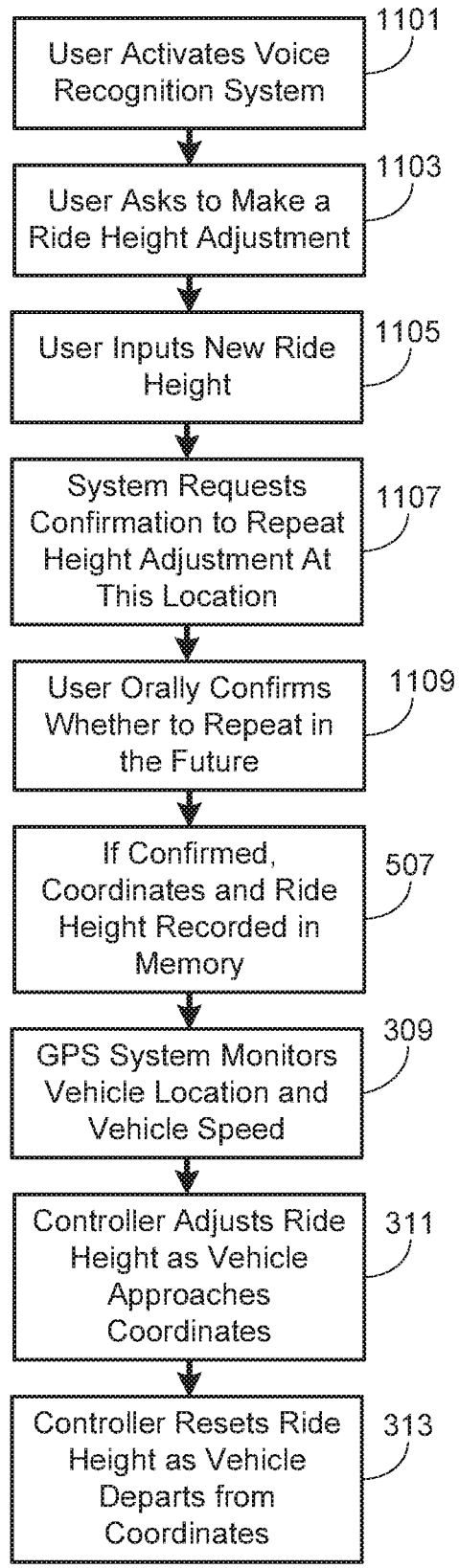
FIG. 11 illustrates the basic methodology associated with a voice recognition interface.

As previously noted, the invention is not limited to a single method for the user to adjust ride height. In a preferred method, the user adjusts the ride height (e.g., step 501) via a data display screen presented on interface 109. An exemplary interface screen 800 is shown in FIG. 8. Preferably the user accesses various interface screens that provide the user with means for setting a variety of vehicle functions, including ride height, by selecting button 801. In the illustrated interface screen, the upper window 803 allows the user to adjust ride height, specifically selecting between low (805), normal (807), high (809) and extra high (811). If the user alters the air suspension from the current setting to a new setting, for example changing from "normal" to the "extra high" setting 811, then preferably a new screen 900 is displayed as illustrated in FIG. 9. In screen 900 the user is asked whether or not to make the same height adjustment each time that the vehicle is at this location (901). The user is able to select either "yes" (903) or "no" (905). If the user selects "yes", then when the driver re-adjusts the air suspension, for example back to the previous setting or back to the "normal" setting (setting 807), then as described above the system either automatically records this location as the end location or asks for confirmation that this location is the end location using a screen similar to screen 900. Note that this same approach can be used with other types of user interfaces. For example and as illustrated in FIG. 10, the user-selectable settings and the confirmation messages can be displayed on a non-touch-screen 1001, and the user can make selections using switches, for example a scroll wheel or a set of hard buttons 1003 located adjacent to the screen as shown in FIG. 10. Alternately, the system can use a voice activated system in which the user audibly makes the height adjustment, for example by activating the voice recognition system (step 1101), requesting to make a ride height adjustment (step 1103) and inputting the desired ride height (step 1105). At this point the system can be programmed to ask for confirmation as to whether or not to make this height adjustment each time the vehicle is at this location (step 1107), to which the user can respond, for example by saying either "yes" or "no" (step 1109). If confirmed, the system records the location and ride height data in memory (step 507). As in the prior embodiments, the end location can either be automatically determined based on the user re-adjusting the air suspension (e.g., back to normal) or when the driver re-adjusts the air suspension and the system confirms that this event corresponds to the end location. Once the location and height information is recorded, the system will operate as previously described, specifically monitoring vehicle location (step 309) and making ride height adjustments as preset by the user (steps 311/313).

Figure 12:
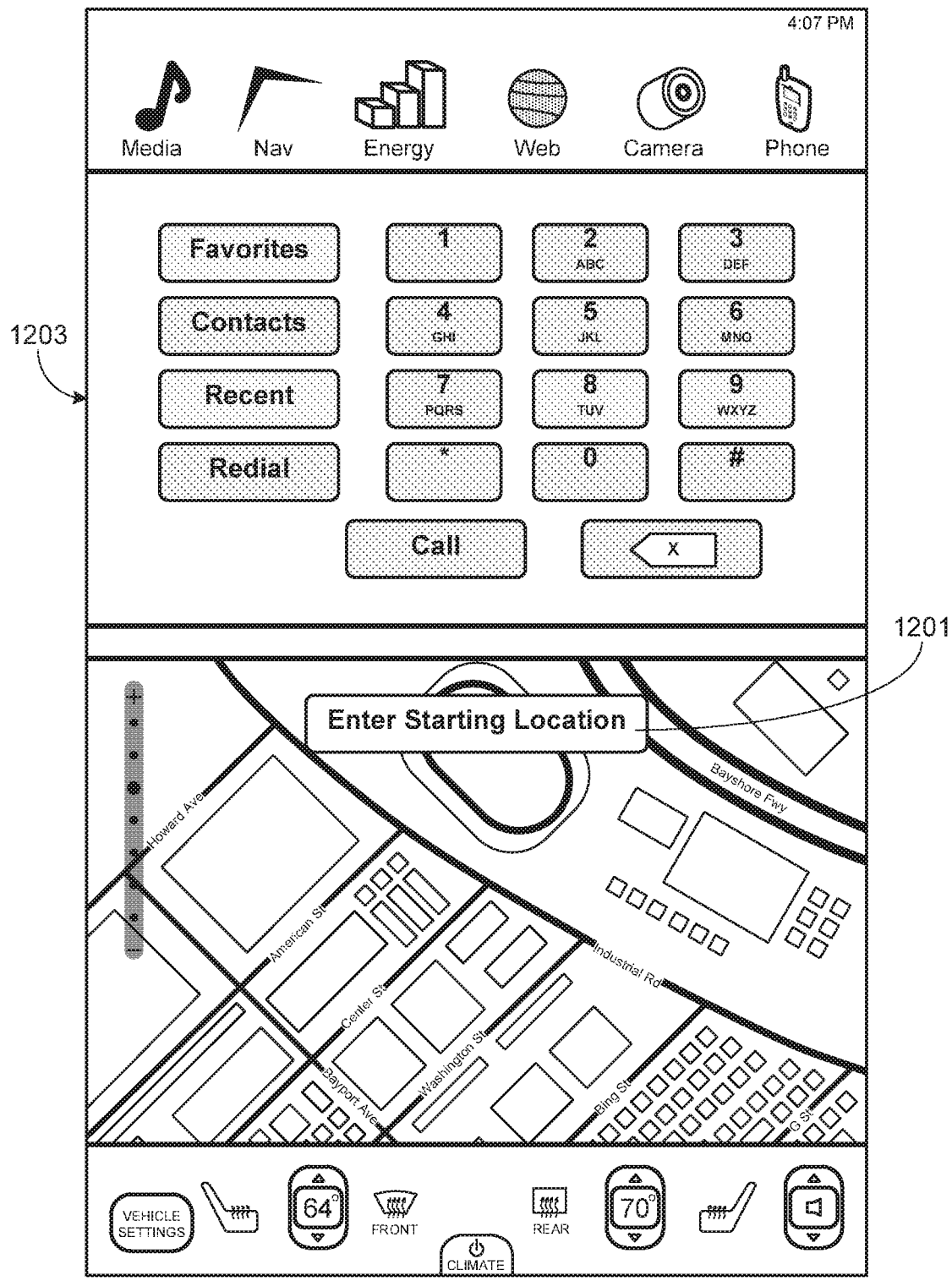
FIG. 12 illustrates a user interface screen requesting location coordinates.
Figure 13:
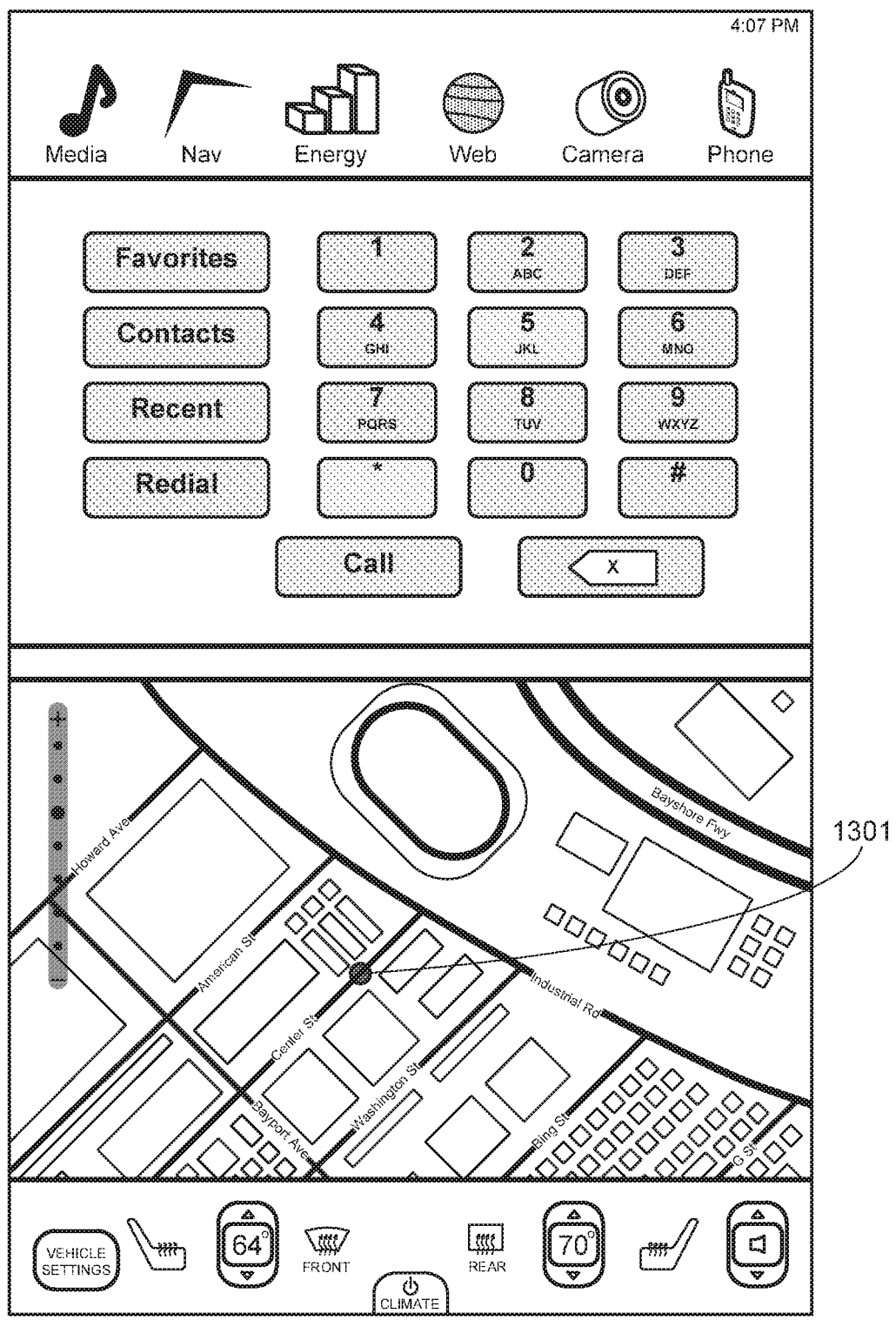
FIG. 13 illustrates the user interface screen of FIG. 12 after the user has input a starting location.
Figure 14:
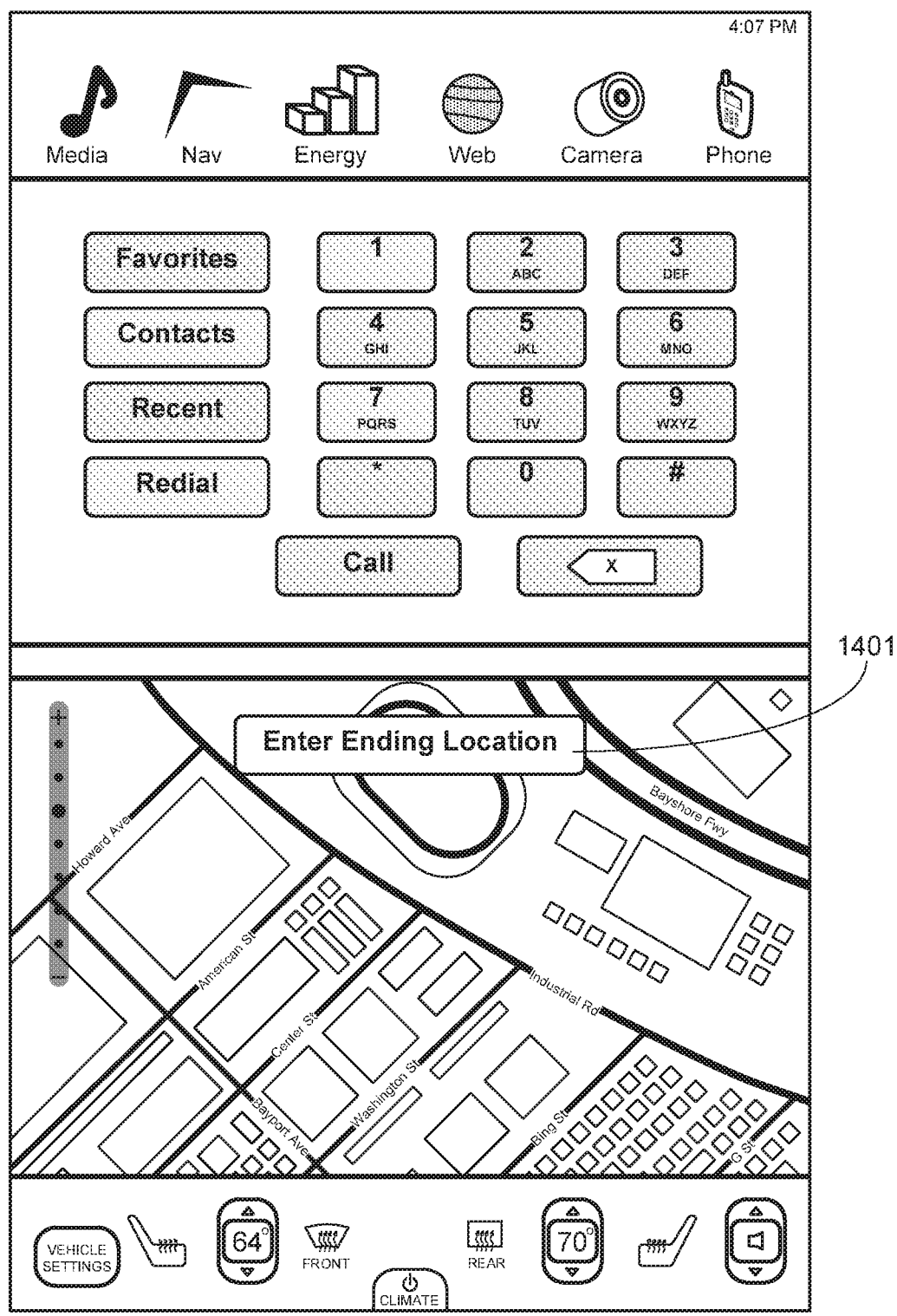
FIG. 14 illustrates the user interface screen of FIG. 12 requesting end location coordinates.
Figure 15:
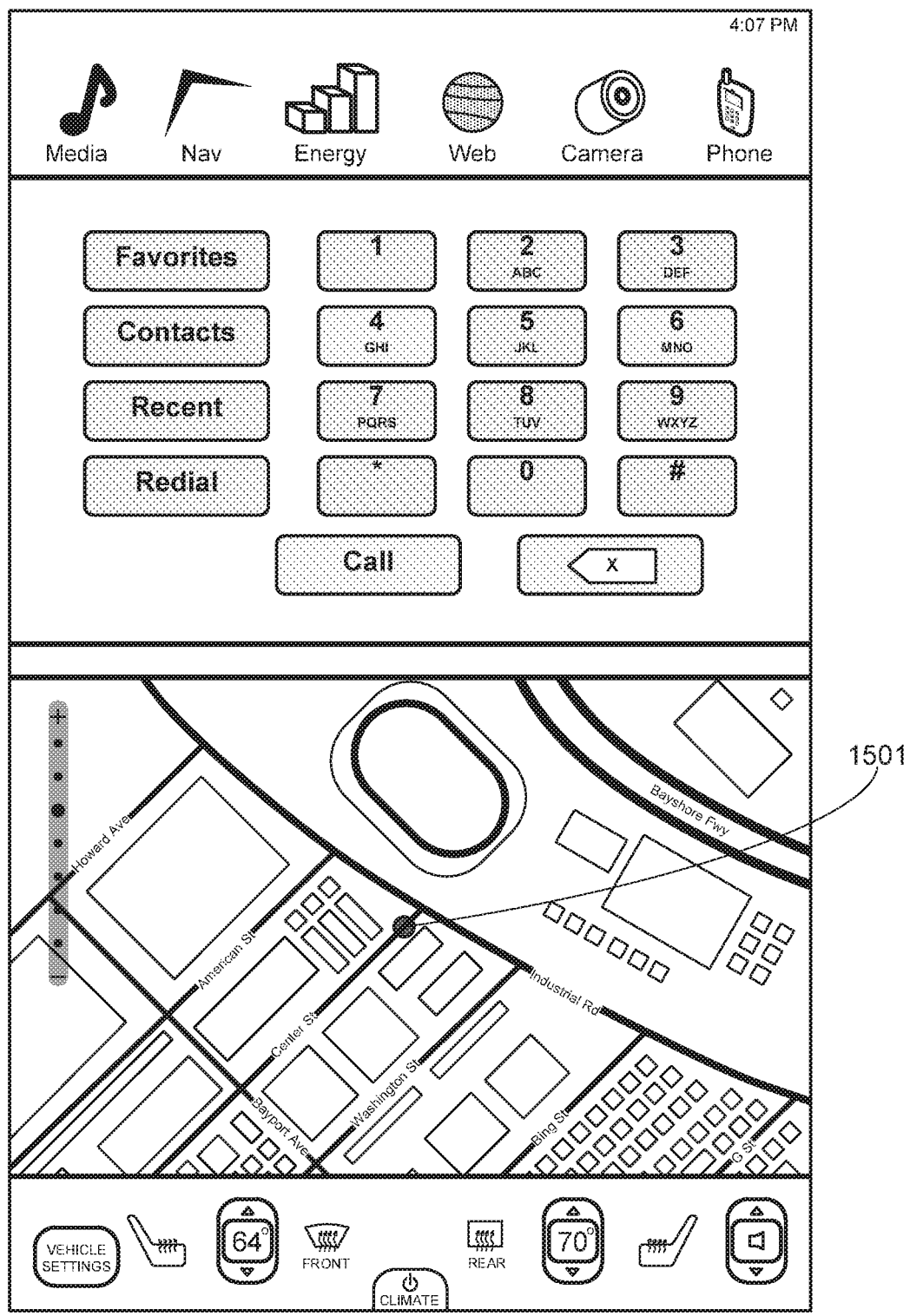
FIG. 15 illustrates the user interface screen of FIG. 12 after the user has input an ending location.
Figure 16:
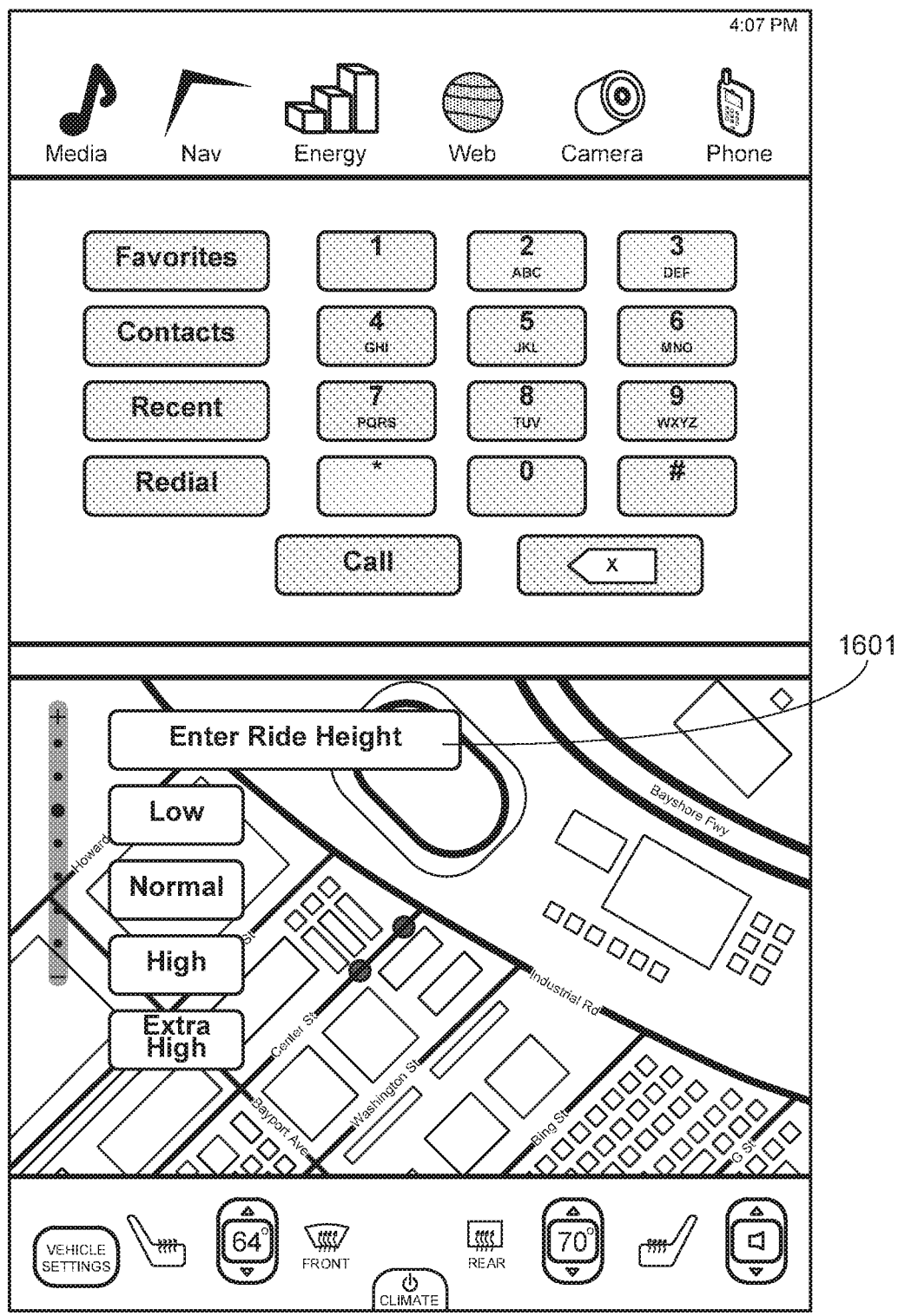
FIG. 16 illustrates the user interface screen of FIG. 12 requesting a ride height selection.
Figure 17:
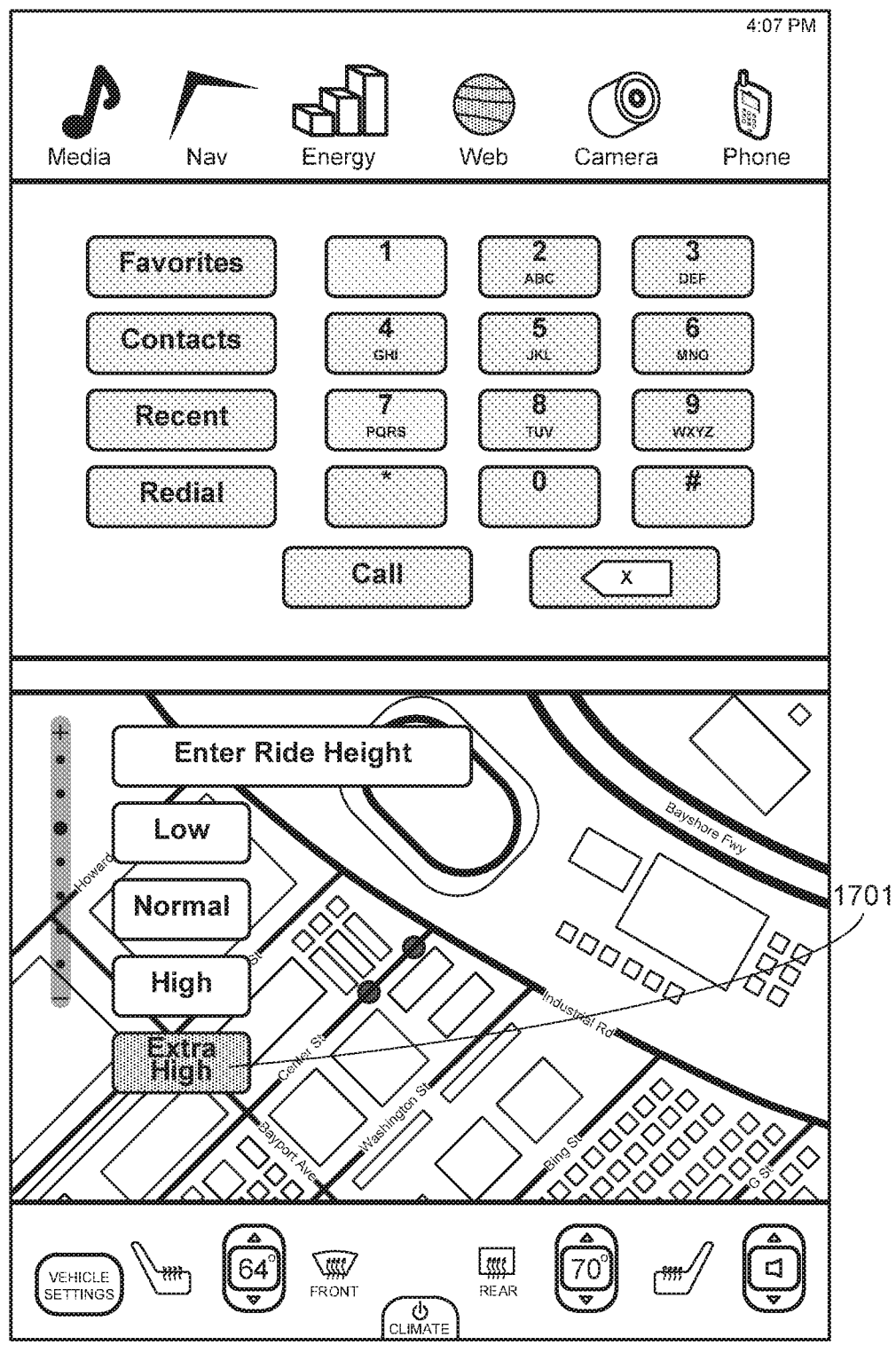
FIG. 17 illustrates the user interface screen of FIG. 12 after the user has selected the ride height.

FIGS. 12-17 illustrate another technique for inputting the coordinates for use with the automatic ride height adjustment system of the present invention. In this embodiment the user inputs the starting location and the ending location on a map supplied by the vehicle's navigation system 215. Preferably once the user initiates this process, the controller queries the user as to the starting location, the ending location and the ride height. Preferably the queries are (i) overlain on the map as illustrated in FIGS. 12, 14 and 16; (ii) presented in a different window on the interface (e.g., the upper window 1203 shown in FIG. 12); or (iii) using audible cues (e.g., "enter starting location", "enter ending location", etc.). Using the overlay approach, in FIG. 12 the controller queries the user for the starting location (query 1201). FIG. 13 illustrates the user selecting a starting location 1301, for example by inputting their selection directly on the screen if a touch-screen is used, or inputting their selecting using a mouse or similar input device if the screen is a non-touch-screen. In FIG. 14 the controller queries the user for the ending location (query 1401). FIG. 15 illustrates the user selecting an ending location 1501. In FIG. 16 the controller queries the user for the ride height (query 1601) to be applied at the selected location. FIG. 17 illustrates the user selecting an "extra high" ride height.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method for operating a vehicle comprising:
   controlling a touch-screen display located within the vehicle to prompt user input regarding ride height adjustment;
   receiving a first user selection via the touch-screen display that corresponds to a first selected location;
   receiving a second user selection via the touch-screen display that corresponds to a preferred ride height associated with the first selected location;
   receiving a third user selection via the touch-screen display that corresponds to a preset distance from the first selected location;
   monitoring the vehicle's location using an on-board global positioning system (GPS);
   monitoring the vehicle's speed; and
   based upon the vehicle's speed, the vehicle's location, a current ride height, the preferred ride height, and the first selected location, adjusting the ride height of the vehicle from the current ride height to the preferred ride height so that the ride height reaches the preferred ride height when the vehicle's location corresponds to the first selected location.

2. The method of claim 1, further comprising maintaining the preferred ride height when the vehicle's location is within the preset distance from the first selected location.

3. The method of claim 1, wherein the preset distance is selected from a menu of predetermined distances.

4. The method of claim 1, wherein the preset distance is a numeric value received via the touch-screen display.

5. The method of claim 1, further comprising automatically adjusting the ride height of the vehicle from the preferred ride height to the normal ride height when the vehicle's location is more than the preset distance from the first selected location.

6. The method of claim 1, wherein the preferred ride height is selected from a menu of pre-determined ride heights.

7. The method of claim 1, further comprising:
   accepting a fourth user selection via the touch-screen display that corresponds to a size of a geo-fence, wherein the geo-fence is in a form of a circle, and wherein a center of the circle corresponds to the first selected location; and
   maintaining the preferred ride height when the vehicle location is within the geo-fence.

8. The method of claim 7, further comprising automatically adjusting the ride height of the vehicle from the preferred ride height to the normal ride height after the vehicle moves outside of the geo-fence.

9. The method of claim 1, further comprising selecting a temporary ride height from a plurality of available ride heights by:
   receiving an audible request to adjust ride height;
   receiving an audible request to select a ride height from a plurality of available ride heights;
   issuing an audible confirmation query requesting confirmation of a selected ride height; and
   adjusting the ride height from a current ride height to the selected ride height.

10. The method of claim 1, further comprising monitoring air pressure via one or more air pressure sensors operably coupled to a controller.

11. A method for operating a vehicle comprising:
    controlling a touch-screen display located within the vehicle to prompt user input regarding ride height adjustment;
    receiving a first user selection via the touch-screen display that corresponds to a first selected location;
    receiving a second user selection via the touch-screen display that corresponds to a preferred ride height associated with the first selected location;

receiving a third user selection via the touch-screen display that corresponds to a distance over which the ride height is to be adjusted;

monitoring the vehicle's location using an on-board global positioning system (GPS);

monitoring the vehicle's speed; and based upon the vehicle's speed, the vehicle's location, the first selected location, and the distance over which the ride height is be adjusted, adjusting the ride height of the vehicle from a current ride height to the preferred ride height so that the ride height reaches the preferred ride height when the vehicle's location corresponds to the first selected location.

12. The method of claim 11, wherein the preferred ride height is selected from a menu of pre-determined ride heights.

13. The method of claim 11, further comprising:

accepting a fourth user selection via the touch-screen display that corresponds to a size of a geo-fence, wherein the geo-fence is in the form of a circle, and wherein a center of the circle corresponds to the first selected location; and maintaining the preferred ride height when the vehicle location is within the geo-fence.

14. The method of claim 13, further comprising automatically adjusting the ride height of the vehicle from the preferred ride height to the normal ride height after the vehicle moves outside of the geo-fence.

15. The method of claim 11, further comprising selecting a temporary ride height from a plurality of available ride heights by:

receiving an audible request to adjust ride height;

receiving an audible request to select a ride height from a plurality of available ride heights;

issuing an audible confirmation query requesting confirmation of a selected ride height; and adjusting the ride height from a current ride height to the selected ride height.

16. A method for operating a vehicle comprising:

controlling a touch-screen display located within the vehicle to prompt user input regarding ride height adjustment;

receiving a first user selection via an audio interface of the touch-screen display that corresponds to a first selected location;

receiving a second user selection via an audio interface of the touch-screen display that corresponds to a preferred ride height associated with the first selected location;

receiving a third user selection via an audio interface of the touch-screen display that corresponds to a preset distance from the first selected location;

monitoring the vehicle's location using an on-board global positioning system (GPS);

monitoring the vehicle's speed; and based upon the vehicle's speed, the vehicle's location, a current ride height, the preferred ride height, and the first selected location, adjusting the ride height of the vehicle from the current ride height to the preferred ride height so that the ride height reaches the preferred ride height when the vehicle's location corresponds to the first selected location.

17. The method of claim 16, wherein the preferred ride height is selected from a menu of pre-determined ride heights.

18. The method of claim 16, further comprising:

accepting a fourth user selection via the touch-screen display that corresponds to a size of a geo-fence, wherein the geo-fence is in a form of a circle, and wherein a center of the circle corresponds to the first selected location; and maintaining the preferred ride height when the vehicle location is within the geo-fence.

19. The method of claim 16, further comprising selecting a temporary ride height from a plurality of available ride heights by:

receiving a request, via an audio interface of the touch-screen display, to adjust ride height;

receiving, via an audio interface of the touch-screen display, a selection of a ride height from a plurality of available ride heights;

issuing an audible confirmation query requesting confirmation of a selected ride height;

receiving, via an audio interface of the touch-screen display, an audible confirmation of the selected ride height; and adjusting the ride height from a current ride height to the selected ride height.

20. The method of claim 16, further comprising monitoring air pressure via one or more air pressure sensors operably coupled to a controller.

\* \* \* \* \*